United States Patent [19]

Naito

[11] Patent Number: 4,943,923
[45] Date of Patent: Jul. 24, 1990

[54] CONSTANT-SPEED RUNNING CONTROL DEVICE FOR VEHICLES

[75] Inventor: Yasuo Naito, Himeji, Japan

[73] Assignee: Mitsubishi Denki Kabushiki Kaisha, Tokyo, Japan

[21] Appl. No.: 177,661

[22] PCT Filed: Jul. 15, 1987

[86] PCT No.: PCT/JP87/00514
   § 371 Date: Mar. 9, 1988
   § 102(e) Date: Mar. 9, 1988

[30] Foreign Application Priority Data

Jul. 18, 1986 [JP] Japan .................................. 61-170149

[51] Int. Cl.$^5$ .............................................. B60K 31/04
[52] U.S. Cl. .......................... 364/426.04; 364/424.01; 180/170; 180/179
[58] Field of Search .................... 364/426.04, 426.05, 364/424.01, 431.07; 180/170, 171, 179; 123/352, 350, 361

[56] References Cited

U.S. PATENT DOCUMENTS

| | | | |
|---|---|---|---|
| 4,202,424 | 5/1980 | Sakakibara et al. | 180/176 |
| 4,419,729 | 12/1983 | Krieder | 364/426.04 |
| 4,467,428 | 8/1984 | Caldwell | 364/426.04 |
| 4,591,986 | 5/1986 | Nakajima et al. | 364/426.04 |
| 4,598,370 | 7/1986 | Nakajima et al. | 364/426.04 |
| 4,650,020 | 3/1987 | Mizuno et al. | 364/426.04 |

Primary Examiner—Parshotam S. Lall
Assistant Examiner—Thomas G. Black
Attorney, Agent, or Firm—Bernard, Rothwell & Brown

[57] ABSTRACT

A constant-speed running control device for vehicles designed to control a vehicle speed by computing a rate of speed deviation change, and correcting acceleration in the event of a large rate of speed deviation change in order to change a controlled variable for the purpose of reducing the speed deviation. This control device has excellent convergence performance capable of maintaining a constant, stable vehicle speed without being affected by variations in cable hysteresis and in the amount of actuator operation.

3 Claims, 8 Drawing Sheets (a)

(b)

(A)

CONSTANT-SPEED RUNNING CONTROL DEVICE FOR VEHICLES

TECHNICAL FIELD

The present invention relates to a constant-speed running control device for vehicles which automatically keeps a constant running speed of a vehicle.

Conventional constant-speed running control devices for vehicles are of the constitution as illustrated in FIG. 1(a). This drawing gives a block diagram showing this type of prior-art constant-speed running control device for vehicles disclosed in for example Laid-Open Japanese Patent No. Sho 58-39311. In this drawing, 1 indicates a SET switch which enables a driver to set the start of constant-speed running; 2 is a CANCEL switch which is operated by operation of a brake system (not illustrated), allowing cancellation of constant-speed running; and 3 is a vehicle speed sensor for sensing a running speed of the vehicle. The speed sensor comprises rotary body 3a which has four magnetic poles and is driven by means of a meter cable (not illustrated) for transmitting rotation of a transmission (not illustrated) and a reed switch 3b, outputs a pulse-train signal at a frequency proportional to the running speed.

A main switch 5 is a power switch for supplying the power of a battery 4 for vehicle. Turning on this main switch 5 supplies the power to a control device 6, which includes a operational processing circuit 6a of a microcomputer, for example, therewithin.

The control device 6 carries out various processing operations to perform automatic control, inputting signals from the SET switch 1, CANCEL switch 2 and vehicle speed sensor 3, controlling the running speed $v_s$ of vehicle to a target speed $v_r$, and outputting various control signals.

A throttle actuator 7 is a motor-driven throttle actuator disposed in an intake passage 8 of an engine (not illustrated). Receiving various signals from the control device 6, it opens and closes a throttle valve 9 in interlock with an accelerator pedal (not illustrated).

This throttle actuator 7 drives the throttle valve 9 through a wire 7b connected to a link 7a which is turned by a motor (not illustrated).

The angle of rotation of the link 7a corresponding to the opening of this throttle valve 9 is sensed by a built-in potentiometer (not illustrated), and given as a throttle position signal to the control device 6.

The link 7a and the motor are connected by means of a magnetic clutch (not illustrated); the connected state is controlled by a magnetic clutch signal from the control device 6.

Next the operation of a conventional constant-speed running control device of the above-mentioned constitution for vehicles is as follows. First, when the main switch is turned on by a driver, the power is supplied from the battery 4 for vehicle to start the operation of the control device 6, thus processing the output of the vehicle-speed sensor 3. This vehicle-speed sensor 3 is outputs a pulse-train signal having a frequency proportional to a running speed $v_s$ at which the vehicle is traveling. The control device 6 measures the period of this pulse, thereby determining the running speed $v_s$.

When the driver operates the SET switch 1, a signal from this switch is given to the control device 6, and the running speed $v_s$ at this time is stored as the target speed $v_r$; thus the control of constant-speed running is started.

Henceforth, the control device 6 compares an actual running speed $v_s$ changing every second, with the target speed $v_r$, and outputs a control signal to drive the throttle actuator 7 and control the opening of the throttle valve 9 so that the vehicle can travel at the target speed $v_r$.

Namely, when the actual running speed $v_s$ is slower than the target speed $v_r$, the control device 6 will output a THROTTLE OPEN CONTROL DRIVE signal to open the throttle valve 9 to a specific amount of opening, and reversely when the actual running speed $v_s$ is higher, a THROTTLE CLOSE CONTROL DRIVE signal will be outputted to close the throttle valve 9 to a specific amount of opening, and therefore the vehicle can travel at a constant speed without the driver's actuation of the accelerator pedal.

If the driver operates the brake system in mid course of such constant-speed running control, the CANCEL switch 2 will operate to give a CONSTANT-SPEED RUNNING CANCEL signal to the control device 6.

Upon receiving this signal, the control device 6 outputs a signal to release the magnetic clutch and the throttle actuator 7, receiving this signal, will release the magnetic clutch.

Therefore, henceforth the driver adjusts the opening of the throttle valve 9 by the accelerator pedal, thus controlling the running speed of vehicle.

The conventional constant-speed running control device for vehicles constitutes a feedback automatic control system which controls the opening and closing of the throttle valve, and accordingly has a problem that control stability will be worsened by lag elements and non-linear elements of each component. For instance, the non-linear elements of cable systems of the throttle actuator and the throttle valve become a problem.

As shown in FIG. 1(b), if the actuator is operated in an attempt to open the throttle valve, the throttle valve will not at all operate, within a certain range A, notwithstanding that the actuator is operating.

If the actuator is kept operating thereafter, the actuator and the throttle valve will show a similar movement (B) from a certain point of time.

Reversely, if the actuator is held stationary for some time, the throttle valve will fail to start moving when it is controlled to close (C), and thereafter the actuator and the throttle valve will make a similar movement (D).

Hysteresis of this cable system varies with vehicles. It is, therefore, impossible to reduce the hysteresis to zero.

The link mechanism through which the actuator operates the throttle valve is controlled by the method of direct control of the throttle valve as shown in FIG. 1(a), a method of control by moving the accelerator pedal lever, and a method of control by operating an intermediate link disposed midway between the accelerator pedal and the throttle valve or outside of the actuator.

The above-mentioned hysteresis largely varies with a difference in this link mechanism. Generally, the method of control by moving the accelerator pedal lever is likely to be accompanied by greater hysteresis than the method of direct control of the throttle valve shown in FIG. 1(a).

There was the problem, as described above, that the running speed could not be kept constant due to the hysteresis of the cable system.

Furthermore, there is the possibility, besides the above-mentioned problem, that the amount of throttle valve opening and closing operation in relation to a control signal from the control device varies due to a change in load and a secular change of the throttle actuator.

There was the problem that lowered running stability resulted from this change in the amount of throttle valve opening and closing operation.

Particularly, the control device has the drawback that if the amount of operation on the valve control of only one side of open or close control side varies, convergence performance becomes worse; for example, if only the amount of operation on the valve close control side decreases, the return of the throttle valve delays; and accordingly the running speed, in most cases, tends to increase slightly higher than the target speed, and reversely if only the amount of operation on the valve open control side decreases, the pull of the throttle valve delays, causing the vehicle to travel at a slightly slower running speed than the target speed.

The present invention has been accomplished in an attempt to solve the aforementioned problems, and has as an object of the provision of a constant-speed running control device for vehicles which insures a constant-speed running and comfortable drive of vehicle without being affected by a change in hysteresis of the cable system and a change in the amount of opening and closing operation of the throttle valve.

SUMMARY OF THE INVENTION

The constant-speed running control device for vehicles of the present invention comprises a first means for inputting an acceleration signal and a speed deviation signal between the target speed and the running speed, and sensing a time of inversion of an acceleration signal code; a second means for determining the rate of speed deviation change between speed deviation at the time of inversion of the acceleration signal code and speed deviation at the time of inversion of a preceding acceleration signal code; and a third means for determining the controlled variable of throttle valve opening from acceleration and speed deviation when the rate of speed deviation change is under a specific value, and for outputting the above-mentioned controlled variable by increasing or decreasing, within a specific period of time, when the rate of speed deviation change is over the specific value.

In the present invention, the rate of change between the speed deviation at the time of inversion of the acceleration signal code is sensed by the first means and the speed deviation at the time of inversion of the preceding acceleration signal code is determined by the second means, and in accordance with this rate of change, the third means corrects the controlled variable. The control device, thus controlling, functions as a constant-speed running system of excellent convergence performance correspondingly to changes in cable hysteresis and in the amount of operation of the actuator.

DESCRIPTION OF PREFERRED EMBODIMENT

Figure 2:
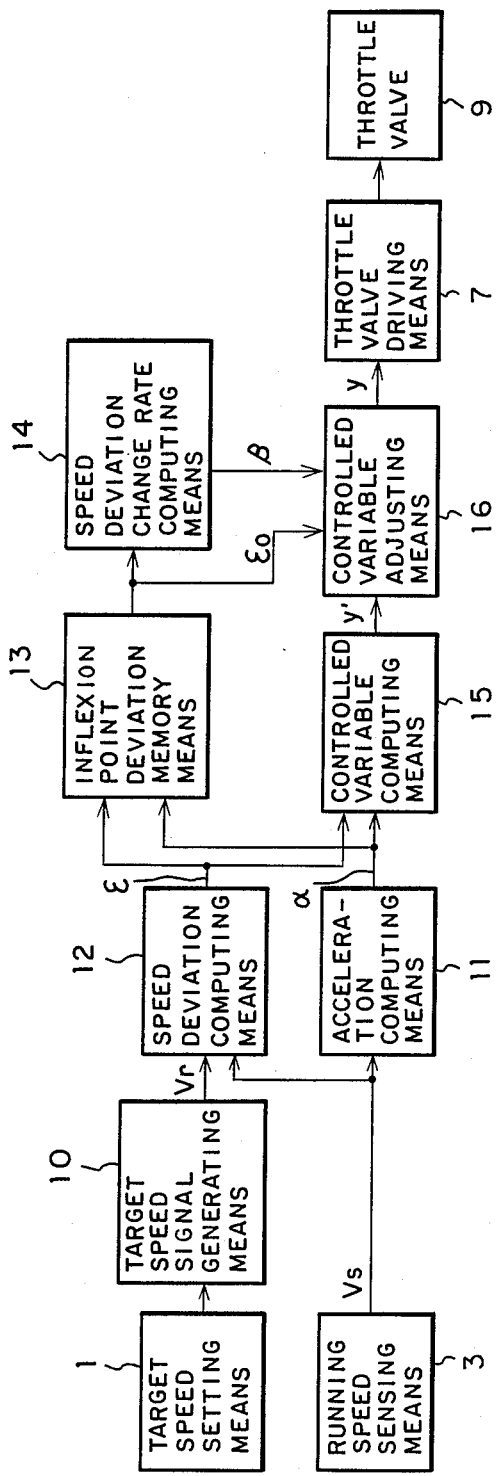
FIG. 2 is a block diagram showing the constitution of one embodiment of a constant-speed running control device of the present invention.

A preferred embodiment of the present invention will now be described with reference to the accompanying drawings. FIG. 2 is a block diagram showing the constitution of the embodiment. In this drawing, numeral 3 designates a running speed sensing means for sensing the running speed of vehicle; and numeral 1 designates a target speed setting means by which a driver sets a desired target vehicle speed.

A target speed signal generating means 10, receiving an output of the target speed setting means 1, indicates the target speed, and outputs a target speed signal $v_r$ to a speed deviation computing means 12.

The running speed sensing means 3 is designed to output the running speed $v_s$ to an acceleration computing means 11 and the speed deviation computing means 12; the acceleration computing means 11 gives an acceleration signal $\alpha$ of vehicle from the running speed $v_s$ and outputs this acceleration signal $\alpha$ to an inflexion point deviation memory means 13 and a controlled variable computing means 15.

The inflexion point deviation memory means 13 stores the speed deviation $\epsilon$ at the time of inversion of the code of acceleration signal $\alpha$, outputting an inflexion point deviation $\epsilon_0$ to a speed deviation change rate computing means 14 and a controlled variable adjusting means 16. The term "code" refers to the polarity sign (+ or −) or direction of the signal or of the parameter to which reference is made.

The controlled variable computing means 15 inputs the acceleration signal $\alpha$ and the speed deviation $\epsilon$, and computes a controlled variable $y'$ for controlling the driving force of vehicle so that the target speed $V_r$ and the running speed $v_s$ will agree, thus outputting the controlled variable $y'$ to the controlled variable adjusting means 16.

The speed deviation change rate computing means 14 is designed to measure a time between inflexion point deviations to determined a change rate of inflexion point deviation, or a speed deviation change rate $\beta$, and outputs it to the controlled variable adjusting means 16.

The controlled variable adjusting means 16 adjusts and outputs the controlled variable $y'$ with the inflexion point deviation $\epsilon_0$ and the speed deviation change rate $\beta$. When the speed deviation change rate 6 exceeds a specific value and the two newest codes of inflexion point deviations stored are inverted, it makes an adjustment toward increasing the controlled variable $y'$ for a specific period.

Furthermore, when the speed deviation change rate $\beta$ exceeds the specific value and the two newest codes of the inflexion point deviations that have been stored are the same, it operates to make an adjustment toward decreasing the controlled variable y' for a specific period.

A throttle valve driving means 7 operates a throttle valve 9 which adjusts the output of the engine (not illustrated) on the basis of the controlled variable y.

Next, an embodiment of the present invention will be explained by reference to FIGS. 3 to 6. In these drawings, numerals 1 to 5 and 8 to 9 are the same as those used in FIG. 1(a).

Figure 3:
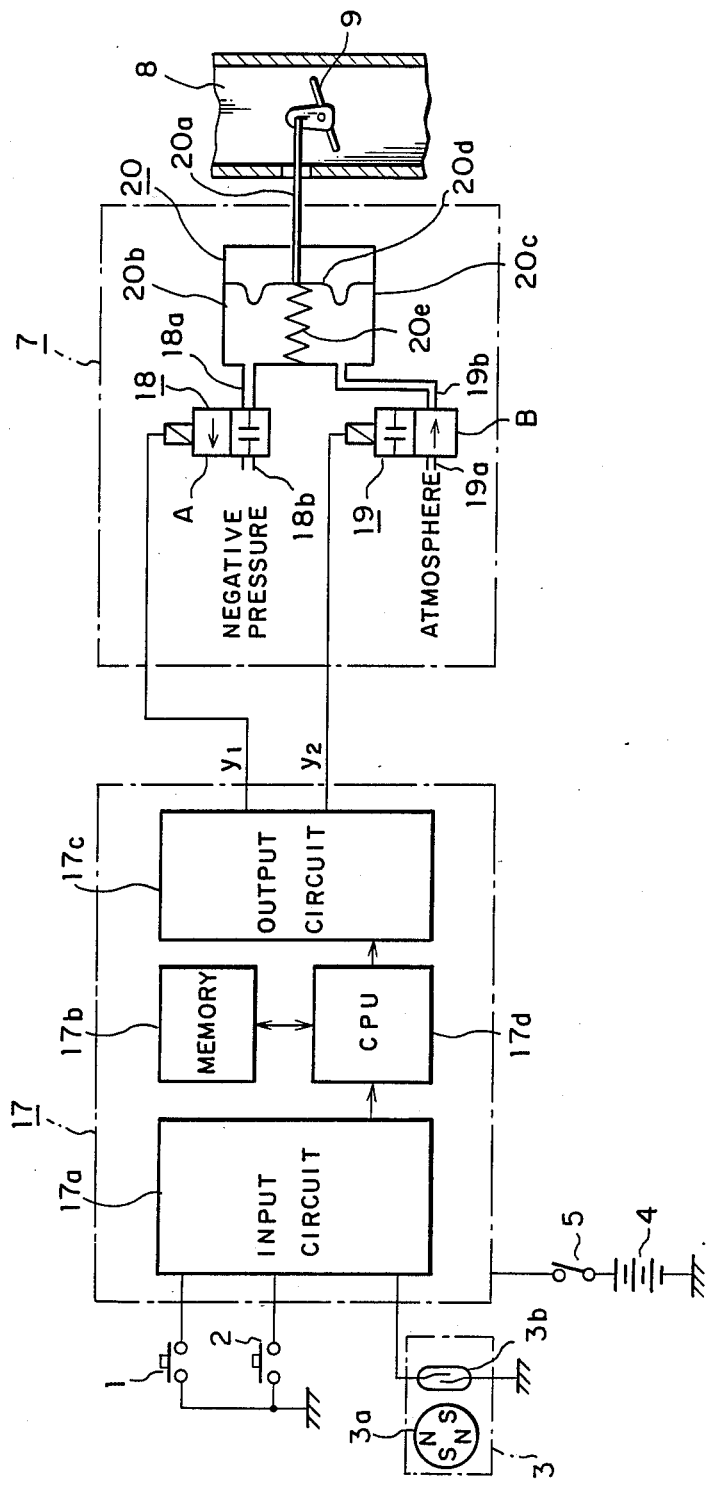
FIG. 3 is a view showing the constitution of a microcomputer unit and a throttle valve driving means in the same constant-speed running control device for vehicles.
Figure 4:
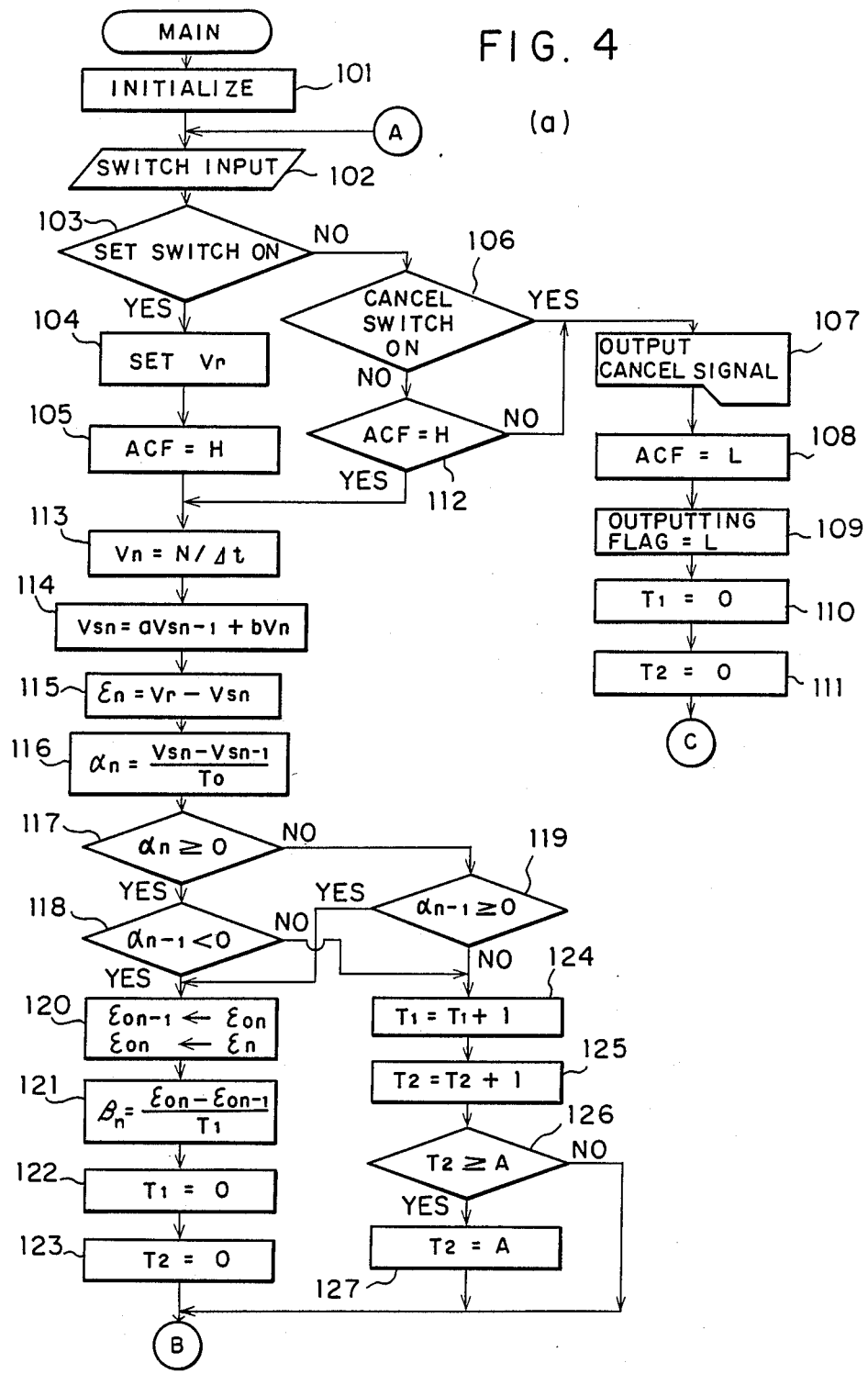
FIGS. 4 (a) to (d) are flowcharts showing the flow operation of the same constant-speed running control device for vehicles.
Figure 4:
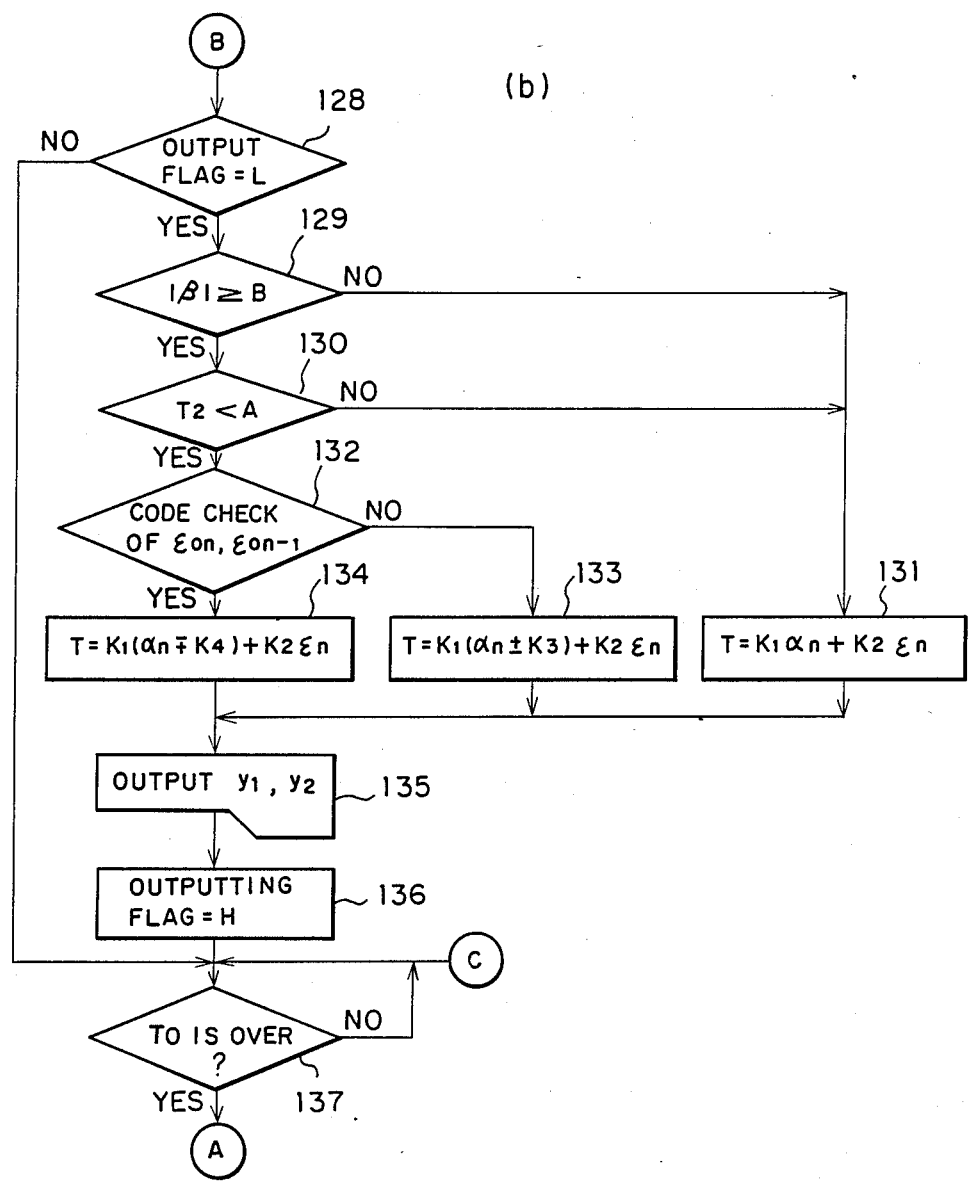
Figure 4:
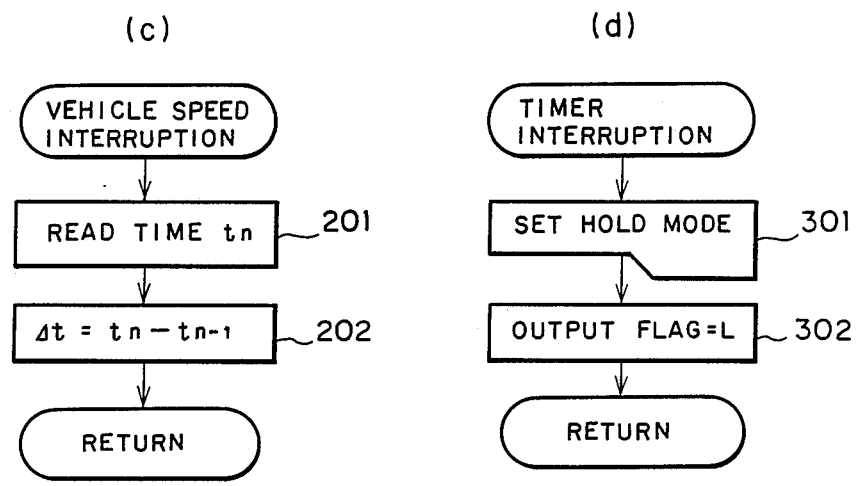

A SET switch 1 and a VEHICLE-SPEED sensor 3 in FIG. 3 correspond to the target speed setting means 1 and the running-speed sensing means 3 in FIG. 2 respectively.

Figure 1:
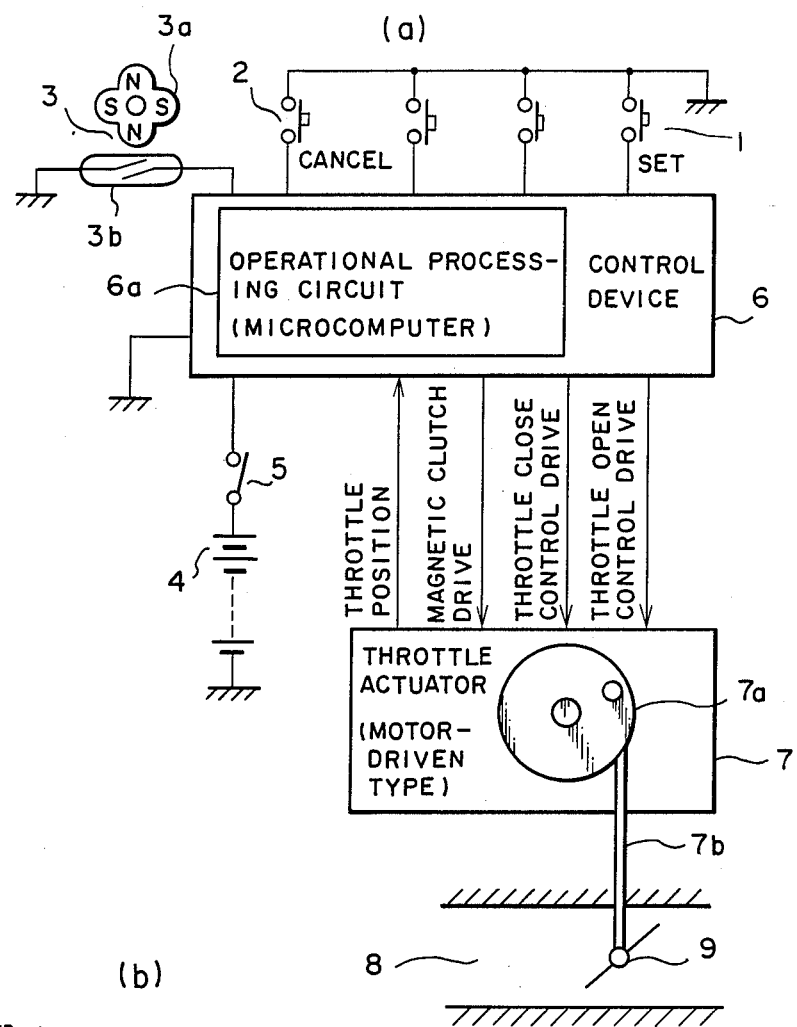
FIG. 1(a) is a general block diagram showing a conventional constant-speed running control device for vehicles.
FIG. 1(b) is a view showing a relationship between the actuator operation of the conventional constant-speed running control device for vehicles and throttle opening.
Figure 1:
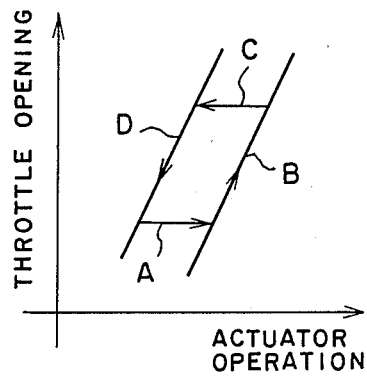

Furthermore, numeral 17 in FIG. 3 is a microcomputer unit which functions as the same control device as the control device 6 in FIG. 1(a). It comprises an input circuit 17a which operates when a main switch 5 is turned on, and inputs and processes signals from the SET switch 1, a CANCEL switch 2, and a VEHICLE-SPEED sensor 3; a memory 17b comprising ROM and RAM for storing instruction programs; an output circuit 17c which outputs control signals; and a CPU 17d which operates in accordance with the instruction programs from the memory 17b, processes signals from the input circuit 17a, and outputs to the output circuit 17c.

A numeral 18 designates a solenoid valve which is controlled by a control signal $y_1$ from the microcomputer unit 17, which disconnects an input tube 18a connected to a negative pressure source (not illustrated), from an output tube 18b when the control signal $y_1$ is at an "L" level, and connects the tubes when the control signal $y_1$ is at an "H" level as shown by the arrow A in the drawing.

A numeral 19 also indicates a solenoid valve which is controlled by a control signal $y_2$. It connects an input tube 19a open to the atmosphere to an output tube 19b as shown by the arrow B in the drawing when the control signal $y_2$ is at the "L" level, and disconnects when the control signal $y_2$ is at the "H" level.

A numeral 20 is a diaphragm device to which the input tube 18a of the solenoid valve 18 and the output tube 19b of the solenoid valve 19 are connected, and which drives the throttle valve 9 through a wire 20a. It includes a diaphragm 20d to which a casing 20c forming an air chamber 20b connected with the input tube 18a and the output tube 19b, and the aforesaid wire 20a are connected, and a spring 20e which is installed between this diaphragm 20d and the casing 20c and presses the diaphragm 20d in the rightward direction illustrated. The solenoid valves 18 and 19 constitute the throttle valve driving means 7.

This throttle valve driving means 7 has three modes of operation as shown in Table 1. When the control signals $y_1$ and $y_2$ are both at the "H" level, the solenoid valve 18 opens, while the solenoid valve 19 closes. Therefore, the air chamber 20b of the diaphragm device 20 communicates only to the negative pressure source, and the diaphragm 20d moves leftwardly in the drawing, thus opening the throttle valve 9 to increase the vehicle speed. That is, the vehicle travels in the acceleration mode.

In the deceleration mode, when the control signals $y_1$ and $y_2$ are both at the "L" level, the solenoid valve 18 closes and the solenoid valve 19 opens. Therefore, the air chamber 20b opens only to the atmosphere, and accordingly the diaphragm 20d, being pressed by the spring 20c, will move rightwardly in the drawing, thus closing the throttle valve 9 and decreasing the vehicle speed.

Furthermore, in the HOLD mode, when the control signals $y_1$ and $y_2$ are at the "L" and "H" levels respectively, both the solenoid valves 18 and 19 close and accordingly the air chamber 20b will be closed off from the negative pressure source and the atmosphere; since the diaphragm 20d will be fixed in a position at this time, the opening of the throttle valve 9 also will be fixed.

TABLE 1

| Operation modes | $Y_1$ | $Y_2$ | Throttle valve |
|---|---|---|---|
| Acceleration mode | H | H | Open |
| Deceleration mode | L | L | Close |
| Hold mode | L | H | Fixed |

Next described is the operation of the embodiment of FIG. 3 that is constituted as previously stated. The operation of the microcomputer unit 17 will be explained particularly by reference to flowcharts of FIGS. 4(a) to (d). FIG. 4(b) shows continuance from FIG. 4(c).

First, when the main switch 5 is turned on, the control device is initialized by Step 101 in FIG. 4(a) and the microcomputer unit 17, supplied with the power, starts operation, executing main routine processing of FIG. 4(a).

Figure 5:
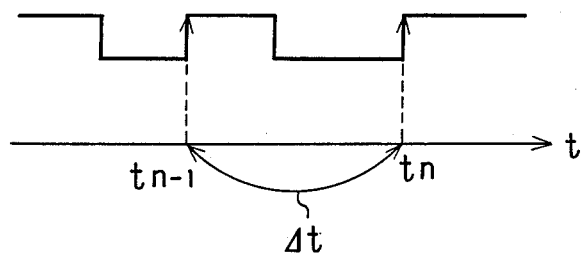
FIG. 5 is a chart showing the output waveform of a vehicle-speed sensor in FIG. 3.
Figure 6:
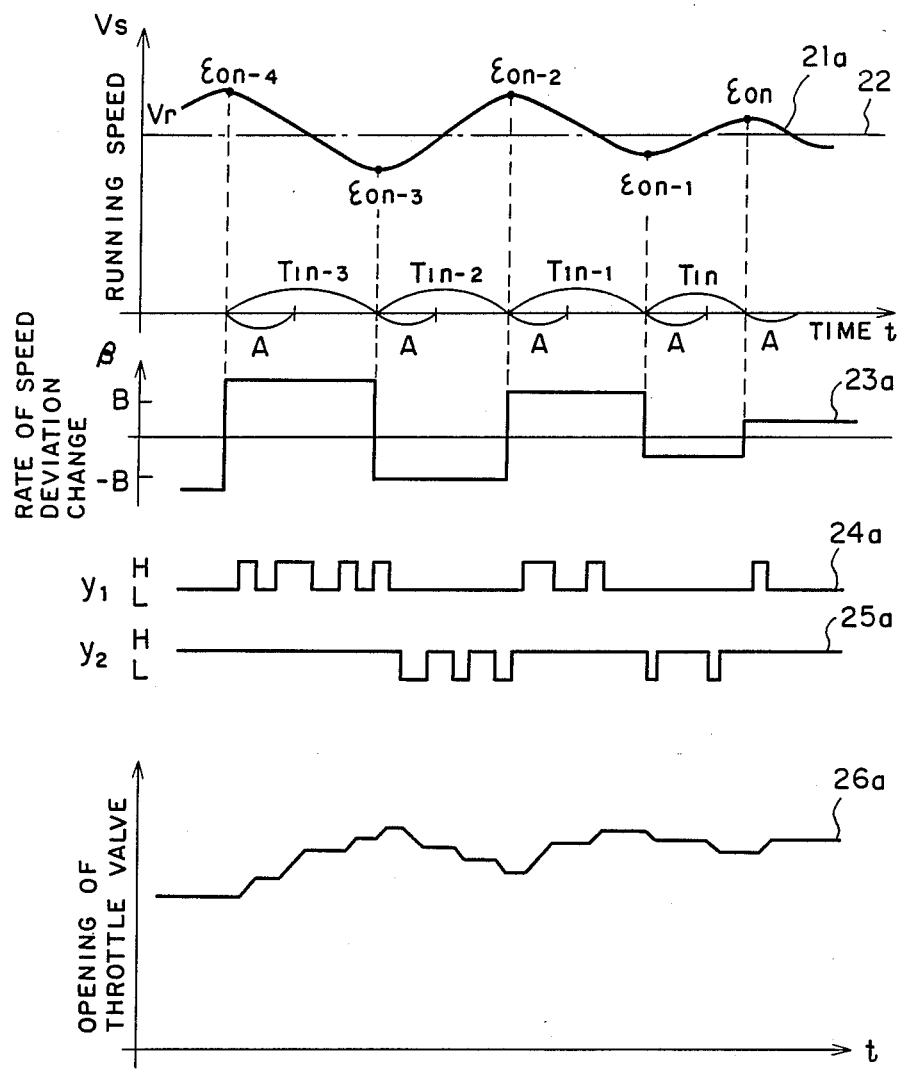
FIGS. 6 (A) and (B) are time charts showing a rate of speed deviation change with respect to the running speed and target speed in the same constant-speed running control device for vehicles, and control signals $y_1$ and $y_2$, and throttle valve operation.
Figure 6:
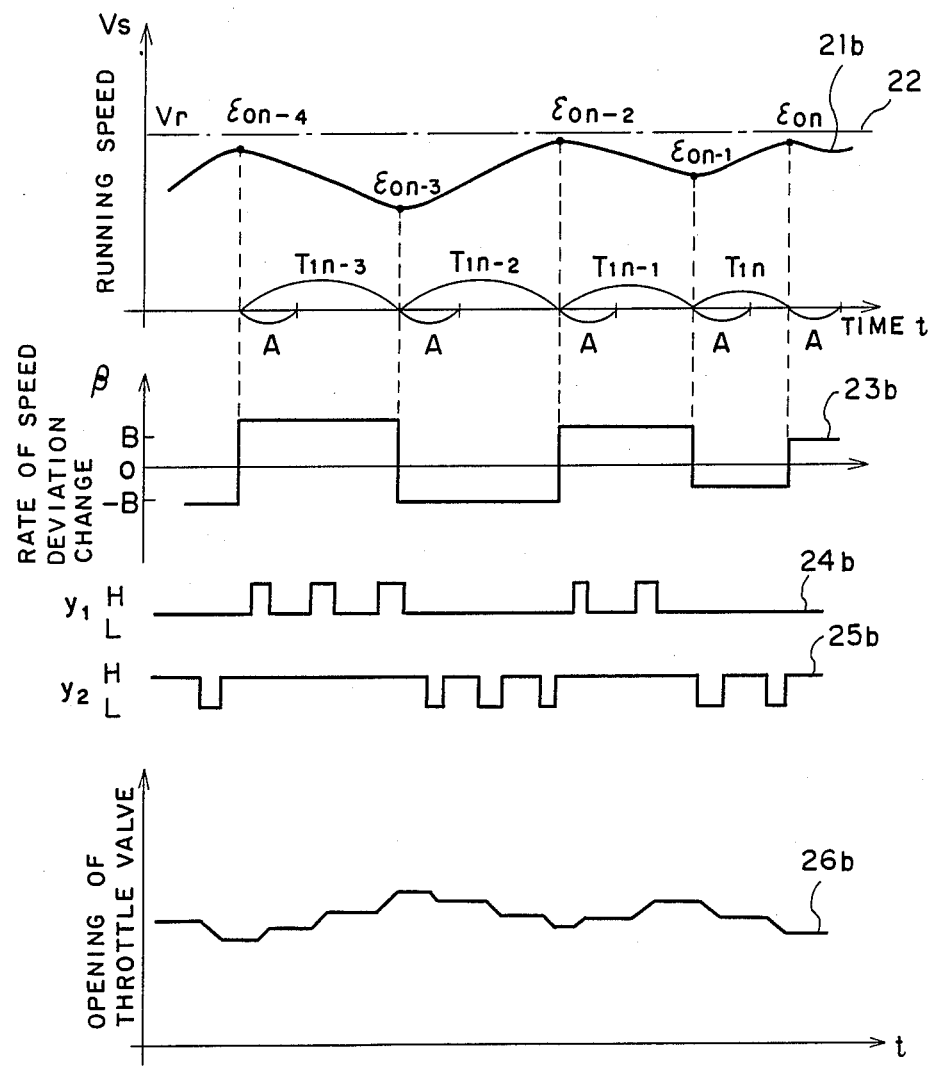

In the meantime, when the vehicle is traveling, the vehicle-speed sensor 3 outputs a pulse-train signal having a frequency proportional to the running speed as shown in FIG. 5. This signal is used to operate the microcomputer unit 17 to perform an interruption routine processing as shown in FIG. 4(c).

Namely, every time the rise of the pulse-train signal of FIG. 5 is inputted, the processing in FIG. 4(c) is executed, and at step 201 the time $t_n$ when the aforesaid rise is inputted, is read from a timer (not illustrated). At Step 202, upon determining a difference $\Delta t$ from the previous time of rise $t_{n-1}$ (i.e. $\Delta t = t_n - t_{n-1}$), or a period, the procedure returns to the main routine in FIG. 4(a).

This period of pulse-train signal thus obtained, the running speed is given by conversion value of the period.

Subsequently, when the driver operates the SET switch 1 during travel to start constant-speed running, the microcomputer 17 inputs this switch operation, as shown at Step 102 in FIG. 4(a); and when, at Step 103, the signal is judged to be as a signal from the SET switch 1, the target speed signal $v_r$ is set from the pulse frequency $\Delta t$ that has been obtained by the interruption routine processing of FIG. 4(c).

At Step 105, a constant-speed running flag (ACF) is set at H.

In the meantime, at Step 106, a check is made to see whether or not the aforesaid switch input signal is from the CANCEL switch (2 of FIG. 3); the signal, if a CANCEL signal, will be outputted to the throttle valve drive means 7 so that the constant-speed running control will be stopped at Step 107.

At Step 108, the constant-speed running flag (ACF) is set to "L". At Step 109, a throttle valve drive signal outputting flag is set to "L". At Step 110, a timer T1 is set to zero, and at Step 111, a timer T2 is set to zero.

At Step 112, a check is made to see whether or not the vehicle is traveling at a constant speed. At Step 113, the running speed is given by the following formula (1) from the newest pulse period Δt that has been obtained in FIG. 4(c).

$$v_n = \frac{N}{\Delta t} \quad (1)$$

where N is a constant for conversion to speed.

At Step 114, noise components are smoothed for the purpose of reduction. For the smoothing means, a digital filter is used, and the running speed $v_{sn}$ is given from for example the following formula (2).

$$V_{sn} = av_{sn-1} + bv_n \quad (2)$$

where a and b are constants expressing smoothing characteristics. n denotes a value obtained this time, while n−1 indicates a previous value.

At Step 115, the speed deviation ε between the target speed $v_r$ and the running speed $v_{sn}$ is given by the following formula (3).

$$\epsilon_n = v_r - v_{sn} \quad (3)$$

At Step 116, acceleration at each fixed time $T_o$ of the running speed $v_{sn}$ is obtained from the following formula (4).

$$a_n = \frac{v_{sn} - v_{sn-1}}{T_o} \quad (4)$$

At Step 117, the code of the aforesaid acceleration, $a_n$ is checked; and when the code is positive, proceed to Step 118 to check the code of the preceding acceleration $a_{n-1}$ and when the code is negative, proceed to Step 120.

In the meantime, at the Step 117, when $a_n$ is negative, proceed to Step 119 to check the code of the preceding acceleration $a_{n-1}$, and when the code is positive, proceed to Step 120.

That is, the time when the acceleration changes from positive to negative or from negative to positive is detected.

At Step 120, $\epsilon_{On}$ is substituted into the speed deviation $\epsilon_{On-1}$ indicated when the code of acceleration changed, and then the speed deviation en indicated this time is substituted into $\epsilon_{On}$.

At Step 121, the speed deviation change rate $\beta_n$ is given by the following formula (5) from the preceding and present speed deviations $\epsilon_{On-1}$ and $\epsilon_n$ and their interval time T1.

$$\beta_n = \frac{\epsilon_{On} - \epsilon_{On-1}}{T1} \quad (5)$$

At Step 122, the time T1 for interval time is set to zero, and at Step 123, the time T2 for specific time is set to zero.

In the meantime, when the code of acceleration has not been inverted, "1" is added to the time, T1 at Step 124, and "1" to the time T2 at Step 125.

At Step 126, a check is made to see whether or not the time T2 is over a specific time A. When the specific time A is over, time T2 is set to A at Step 127.

Next, in the flowchart of FIG. 4(b) continued from FIG. 4(a), Step 128 checks whether or not the control signal output flag is L, that is, whether or not the control signal is being outputted. When no control signal is outputted, Step 129 checks to see whether or not the speed deviation change rate β is out of the range of the specific value B. If $|\beta| \geq B$, Step 130 checks whether the time T2 is over the fixed period time A.

When $|\beta| < B$, or T2≧A, a controlled variable for controlling the opening of the throttle valve 9 is computed from the acceleration α and the speed deviation ε at Step 131.

The following formula (6) can be considered as one method of operation.

$$T = K_1 a_n + K_2 \epsilon_n \quad (6)$$

where $K_1$ and $K_2$ are constants.

In the meantime, at Step 132, the code of speed deviation at the two newest inflexion points is checked. If the code is a different code, the procedure proceeds to Step 133.

That is, when the speed deviation change rate $|\beta|$ is over the specific value B and the code of inflexion point deviation is inverted within the fixed period of time A, Step 133 operates so as to increase the controlled variable. As one method, the following formula (7) can be considered.

$$T = K_1(a_n \pm K_3) + K_2 \epsilon_n \quad (7)$$

where $(a_n \pm K_3)$ means that $K_3$ should be added when the acceleration $a_n$ is positive, and $K_3$ should be subtracted when $a_n$ is negative. $K_3$ is a constant.

Furthermore, if the speed deviation change rate $|\beta|$ is over the specific value B and the code of the inflexion point deviation is the same within the fixed period of time A, operation is executed to decrease the controlled variable at Step 134. As one method, the following formula (8) can be considered.

$$T = K_1(a_n \pm K_4) + K_2 \epsilon_n \quad (8)$$

where $(a_n \pm K_4)$ signifies that when the acceleration $a_n$ is positive, $K_4$ should be subtracted, and when $a_n$ is negative, $K_4$ should be added. Here, $K_4$ is a constant.

At Step 135, the output level of the controlled variables y1 and y2 is obtained from Table 2 given below, using the code of the controlled variable T, that is, the output time T, and is outputted, and also starts the timer (not illustrated).

Step 136, the control signal outputting flag is set to H. At Step 137, wait until the fixed period of time $T_o$ is over. After $T_o$ is over, return to Step 102 and execute each step by the similar procedure.

TABLE 2

| T | Control modes | Y1 | Y2 |
|---|---|---|---|
| Positive | Acceleration mode | H | H |
| Negative | Deceleration mode | L | L |
| 0 | Hold mode | L | H |

At Step 135, the control signal is outputted and the timer starts. When, at this time, the timer counting value agrees with the output time T, the timer interruption routine processing of FIG. 4(d) will be performed.

In this FIG. 4(d), at Step 301, the output level of the control mode and hold mode is set. At Step 302, the control signal output flag is set at "L", and the procedure returns to the main routine again. As described above, in the acceleration or deceleration mode, the output of the output time T is given from the microcomputer unit 17 to the throttle valve drive means 7. In the acceleration mode, the air chamber 20b of the diaphragm device 20 contracts and accordingly the diaphragm 20d will move in the leftward direction in the drawing and the throttle valve 9 will open to a specific amount.

In the deceleration mode, the air chamber 20b expands, and accordingly the diaphragm 20d will move in the rightward direction in the drawing, and the throttle valve 9 will close to a specific amount.

One example of the above-mentioned operation is shown in FIG. 6(A) and FIG. 6(B). It is presumed that the running speed has changed as indicated by 21a in FIG. 6(A) and 21b in FIG. 6(B). The numeral 22 in FIG. 6(A) and FIG. 6(B) designates the target speed, and 23a in FIG. 6(A) and 23b in FIG. 6(B) indicate the speed deviation change rate 8 determined from the running speed 21, the target speed 22, the acceleration code-reversing time point $\epsilon_{On}$, and the interval time $T_{1n}$.

The controlled variable T is computed from the acceleration $\alpha$ (not illustrated), the speed deviation $\epsilon$, the speed deviation change rate B, the code of speed deviation $\epsilon_{On}$ at the time of acceleration code reversion, and the specific time period A.

In FIG. 6(A), when the speed deviation change rate $|\beta| \geq B$, and within the specific time period A, and the codes of the speed deviation $\epsilon_{On}$ and $\epsilon_{On-1}$ are inverted, the controlled variable T is so calculated out as to increase more than usual, and the control signals $y_1$ and $y_2$ will become 24a and 25a respectively as shown in FIG. 6(A).

The opening of the throttle valve varies in accordance with this control signals as indicated by 26a in FIG. 6(A).

Under the above-mentioned specific conditions, control is made to increase a computed controlled variable to operate the throttle valve early in order to reduce speed deviation.

In FIG. 6(B), on the other hand, when the speed deviation change rate is $|\beta| > B$, and within the specific period time period A, and the codes of the speed deviations $\epsilon_{On}$ and $\epsilon_{On-1}$ are the same, the controlled variable T will be calculated out so as to decrease more than usual. Thus the control signals $y_1$ and $y_2$ will become 24b and 25b respectively as shown in FIG. 6(B). Therefore, the opening of the throttle valve varies as indicated by 26b in FIG. 6(B).

As noted above, the term "code" is used to refer to the polarity or direction of the signal or parameter to which reference is made. Thus, at each inflexion point, the code or direction of the acceleration changes from positive to negative or vice versa. Similarly, speed deviations $\epsilon$ representing speed deviations above the target speed $v_r$ are of the opposite or inverted code from speed deviations below the target speed. Thus, in FIG. 6(A), $\epsilon_{On}$ and $\epsilon_{On-1}$ are of opposite inverted codes, with one above and the other below the target speed, whereas in FIG. 6(B), $\epsilon_{On}$ and $\epsilon_{On-1}$ are of the same code.

Under the above-mentioned specific conditions, the control device is designed to decrease the computed controlled variable, and restricts the operation of the throttle valve to reduce the speed deviation, thereby insuring constant-speed, stable running.

The throttle valve drive means 7 consists of the solenoid valves 18 and 19 and the diaphragm device 20, but a motor-driven type such as the conventional one shown in FIG. 1(a) may be used.

What is claimed is:

1. A constant-speed running control device for vehicles, comprising:
   a running speed sensing means which senses the running speed of a vehicle and produces a running speed signal;
   an acceleration computing means for determining acceleration of the vehicle over selected time periods from changes in said running speed signal produced by said running speed sensing means and for generating an acceleration signal;
   a target speed setting means for setting a target speed of the vehicle;
   a target speed signal generating means for generating a target speed signal as a function of a signal from said target speed setting means;
   a speed deviation computing means for determining speed deviation between said target speed signal generated by said target speed signal generating means and said running speed signal and for generating a speed deviation signal;
   a driving force control means for controlling a driving force of the vehicle;
   a controlled variable computing means for inputting said acceleration signal and said speed deviation signal and computing a controlled variable which controls the driving force of the vehicle such that the target speed signal and the running speed signal agree;
   an inflexion point deviation memory means for storing said speed deviation signal at the time of inversion of codes of said acceleration signal;
   a speed deviation change rate computing means for measuring a time between consecutive inflexion point deviations stored by said inflexion point deviation memory means, and determining a rate of change of inflexion point deviation; and
   a controlled variable adjusting means for adjusting said controlled variable responsive to said speed deviation change rate and said rate of change of inflexion point deviation, and outputting said controlled variable to said driving force control means.

2. A constant-speed running control device for vehicles as claimed in claim 1, wherein said controlled variable adjusting means makes adjustments to increase said controlled variable for a specified time period when said speed deviation change rate exceeds a specific value and the codes of the two newest inflexion point deviations are inverted.

3. A constant-speed running control device for vehicles as claimed in claim 1, wherein said controlled variable adjusting means makes adjustment to decrease said controlled variable for a specific time period when said speed deviation change rate exceeds a specific time period when said speed deviation change rate exceeds a specific value and the codes of the two newest of said inflexion point deviations stored are the same.

* * * * *

UNITED STATES PATENT AND TRADEMARK OFFICE
CERTIFICATE OF CORRECTION

PATENT NO. : 4,943,923

DATED : July 24, 1990

INVENTOR(S) : Yasuo Naito

It is certified that error appears in the above-identified patent and that said Letters Patent is hereby corrected as shown below:

Column 1, line 20, "The speed sensor comprises" should be --It, comprising a--.

Column 3, line 58, "correspondingly" should be --corresponding--.

Column 5, line 31, "y" should be --$y_1$--.

Column 6, line 54, after "set" insert --at Step 104--.

Column 7, line 52, "$\epsilon_n$" should be --$\epsilon_{On}$--.

Column 8, line 53, before "Step" insert --At--.

Column 9, line 50, before "time" delete the word "period".

Signed and Sealed this

Fourth Day of August, 1992

Attest:

DOUGLAS B. COMER

*Attesting Officer*   *Acting Commissioner of Patents and Trademarks*